T. D. MILLER.
CAN DEHEADING MACHINE.
APPLICATION FILED DEC. 24, 1917.
1,263,338.
Patented Apr. 16, 1918.
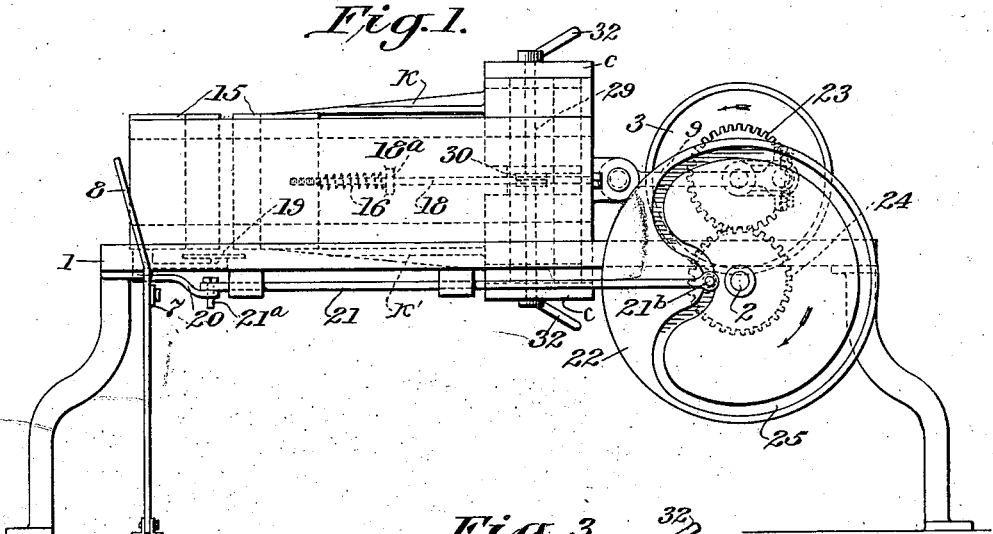
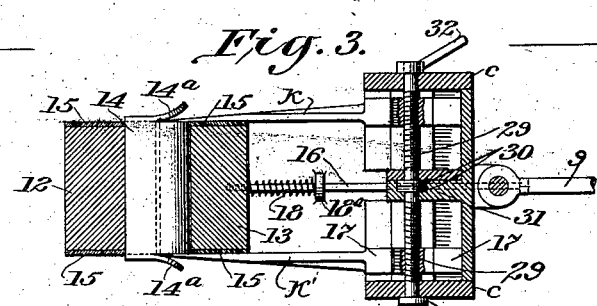
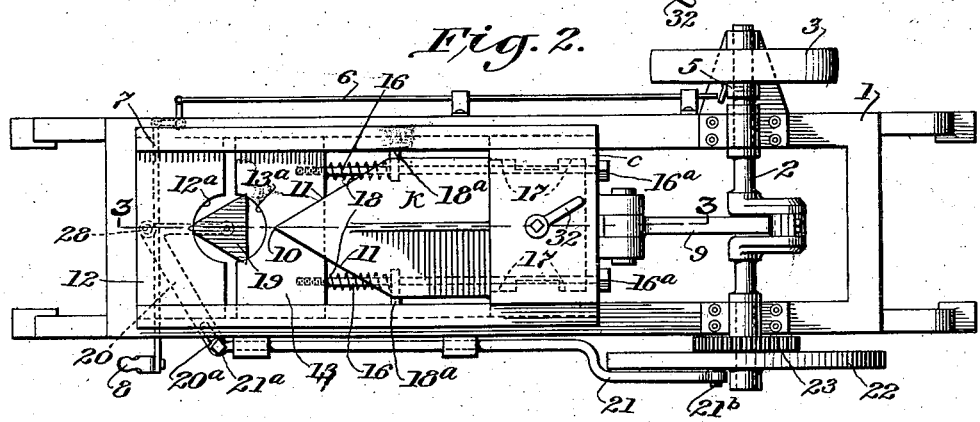
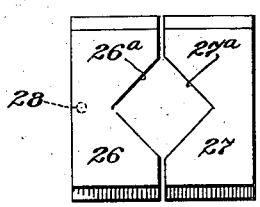
Inventor
T. D. Miller
By
Watson Boyden
Attorneys

UNITED STATES PATENT OFFICE.

THOMAS D. MILLER, OF CATONSVILLE, MARYLAND.

CAN-DEHEADING MACHINE.

1,263,338.

Specification of Letters Patent.  Patented Apr. 16, 1918.

Application filed December 24, 1917. Serial No. 208,626.

*To all whom it may concern:*

Be it known that I, THOMAS D. MILLER, a citizen of the United States, residing at Catonsville, in the county of Baltimore and State of Maryland, have invented certain new and useful Improvements in Can-Deheading Machines, of which the following is a specification.

The present invention relates to a machine for removing the heads from tin cans in order that the metal of the body portions of the cans may, after removal of the seams, be flattened out and used for various purposes, such as the manufacture of metal shingles, heads of paper canisters, fuse holders for ordnance shells, etc. In my Patent No. 1,058,379, I have shown a machine in which the heads of cylindrical cans are removed by means of saws. There are large numbers of cans, angular in cross-section, which are daily thrown away by householders after removal of their contents, and the sawing machine of the prior patent referred to would not be suitable for de-heading such cans. In order to conserve the bodies of cans having angular sides, as well as of cans of cylindrical shape, I have provided a machine in which the heads of the cans are removed by shearing knives, which first puncture the can bodies and then shear off the heads. The cans are held between jaws having recesses conforming to the shape of the can body, and the knives are preferably V-shaped and are arranged so that their pointed ends will pass diametrically through the cans while their slanting edges shear the can in opposite directions from the line of puncture.

While the machine is useful for conserving the metal of old tin cans, it is also useful for quickly removing the heads and simultaneously releasing the contents of cans containing food stuffs or other ingredients, when the ingredients are to be used.

In the accompanying drawing,

Figure 1 is a side elevation of the can-deheading machine;

Fig. 2 is a top plan view of the same;

Fig. 3 is a vertical section on the line 3—3 of Fig. 2; and,

Fig. 4 is a plan view of a pair of jaws for holding an angular can.

Referring to the drawing, 1 indicates a suitably supported table or bed, upon which is mounted a crank shaft 2, which is operated intermittently from a constantly driven fly wheel pulley 3, a suitable one-revolution clutch 5 being provided for connecting the fly wheel to the crank shaft when it is desired to operate the machine. The rods 6 and 7, movable by a hand lever 8, are provided for the purpose of throwing the clutch members into engagement. Any suitable form of clutch that will disengage itself at the end of one revolution of the crank shaft may be employed, and details of the clutch are not shown.

Upon the bed 1 is arranged a cross-head $c$, which slides on the bed and is movable back and forth by the crank shaft through the medium of a connecting rod 9. This cross-head carries two similar shearing knives, $k$ and $k'$, arranged one above the other, and projecting forwardly from the cross-head. These knives, as shown, have V-shaped ends, the points 10 of the knives being midway between the guide rails of the bed, and the edges 11 of the knives sloping rearwardly and outwardly. At the forward end of the bed is arranged a fixed jaw 12 which, as shown in Fig. 2, has a semicircular recess $12^a$, and opposed to this fixed jaw is a movable jaw 13, having a corresponding recess $13^a$, opposed to the recess $12^a$. The recesses extend vertically in the adjacent faces of the jaws, and when the jaws are brought together, they are adapted to grip and hold the body of a cylindrical can, in vertical position, with the heads projecting slightly above and below the jaws, as indicated in Fig. 3, wherein 14 indicates the can and $14^a$ the heads thereof. The jaws are faced on the top and bottom by steel plates 15, and the cutting ends of the knives are movable in close engagement with these plates, with which they coöperate to shear the can bodies. The parts are shown in their normal positions in Fig. 2, the jaw 13 being moved away from the jaw 12, and the knives being out of registry with the recesses in the jaws. The jaw 13 is connected with the cross head $c$ by lost motion devices comprising bolts or rods 16, which are secured to the jaw and pass loosely through guides 17 in the cross-head, these bolts being provided with heads $16^a$ at the rear of the cross-heads, so that when the latter is drawn backward, it will engage the heads of the bolts and pull the jaw 13 away from the jaw 12. Between fixed lugs $18^a$ on the frame and the jaw 13, springs 18 are interposed, these springs surrounding the rods 16. These springs are compressed by the backward movement of the jaw 13, and when the cross-head moves forward, or to the left in Fig. 2, the springs move the jaw 13 forward into gripping engagement with the can before the pointed ends 10 of the knives engage the can. When the machine is started into operation by throwing the hand lever 8, the can being in position between the jaws, it is first firmly gripped by the forward movement of the jaw 13, and then the pointed ends of the knives puncture the can body adjacent the heads and the sloping edges of the knives, as the latter move forward, coöperate with the shearing edges of the plates 15 and shear the body in opposite directions from the points of puncture, the points of the knives moving in a diametrical line and first puncturing the can at one side and then at diametrically opposite points. The can heads are thus cut off during one-half revolution of the crank shaft and the knives are drawn back to normal position during the succeeding half-revolution. As the knives move backward, the cross-head engages the heads 16ª on the bolts 16 and draws the jaw 13 away from the jaw 12, thus permitting the de-headed can body to drop downward out of the machine and compressing the springs 18.

In order to properly position the can body, and to support it until the jaws are closed upon it, a movable support 19 is provided beneath the opening in the jaws. This support, as shown, is carried by a bell-crank 20, pivoted at 28, to the underside of the jaw 12, and one arm of the bell crank has a slot 20ª, engaged by a coupling pin 21ª on a sliding rod 21, which latter is operated at intervals by a cam wheel 22. This cam wheel, as shown, is driven by gears 23 and 24 on the crank shaft 2, in the direction indicated by the arrow, and it has a cam groove 25 which is engaged by a pin 21ᵇ on the rod 21. This cam groove is so designed that when the crank shaft is at rest, the support 19 will be below the recesses in the jaws, in position to support a can. When the clutch is tripped and the jaw 13 is moved into gripping engagement with the can, the cam groove 25 causes the rod 21 to move forward, or to the left in Fig. 2, and swing the support 19 from beneath the can. The cam groove 25 is so formed that the support will be held out of line with the can until the knives have sheared off the heads of the can and the knives and jaw 13 have returned substantially to their normal positions. When the jaw 13 moves away from the can, the latter drops down through the recesses between the jaws and the support 19 is then swung into place to support the next can to be operated upon. If the machine is used for opening full cans, the contents will, of course, drop out when the heads are sheared off and will be caught by a suitable receptacle placed beneath the jaws.

It will be understood that the recesses in the jaws must correspond in shape and size substantially to the shape and size of the cans to be operated upon. Thus there will be different sets of jaws for different kinds of cans. For instance, in operating upon old tin cans, the cans taken from the dumps will be assorted according to their sizes and shapes and when all those of one size and shape have been de-headed, the jaws will be changed to suit another size or shape. In Fig. 4, I have shown a pair of jaws suitable for a can of square cross-section. When square cans are operated upon, it is desirabel that the pointed ends of the knives shall puncture the cans at the corners, where the cans are stiffened and will not bend inwardly. For this reason, the jaws 26 and 27, to hold a square can, will have opposed V-shaped recesses 26ª and 27ª, which will hold the can so that the knives will puncture it at its corners. The jaw 26, which is the stationary jaw, is provided on its under-side with a suitable pivot pin 28, shown in dotted lines, upon which the bell crank 20, which carries the support 19, may be mounted when the jaws are placed in the machine. As the cans vary in height, the jaws must also vary in height, and the knives must be adjustable to engage the upper and lower surfaces of the various jaws. As a means for adjusting the knives, adjusting screws 29 are provided in the cross-head, these screws having collars 30 at the center, journaled in a support 31, and the two screws engaging threaded openings in the knives. By means of handles 32, the screws can be turned to adjust the knives toward and from one another and toward and from the upper and lower surfaces of the jaws.

The operation of the invention will be clear from the foregoing without further description. After the heads have been removed from the cans, the seams are removed from the can bodies by suitable mechanism, such as the seam-remover shown in my patent above referred to, and the bodies are then passed through straightening rolls which flatten them so that they can be stacked in piles or used for various purposes.

What I claim is:

1. In a can deheading machine, a pair of jaws adapted to hold a can with its heads projecting slightly beyond the jaws, shearing knives on opposite sides of the jaws, and means for moving the jaws and knives relatively to one another to shear the heads from the can body.

2. In a can deheading machine, a pair of jaws adapted to hold a can with its heads projecting slightly beyond the jaws, shearing knives on opposite sides of the jaws, said knives having pointed ends for puncturing the can body, and means for moving the jaws and knives relatively to one another to shear the heads from the can body.

3. In a can deheading machine, a pair of jaws adapted to hold a can with its heads projecting slightly beyond the jaws, V-shaped shearing knives on opposite sides of the jaws having their pointed ends adapted to enter the cans diametrically, and means for reciprocating the jaws and knives relatively to one another to shear the heads from the can bodies.

4. In a can deheading machine, a pair of jaws adapted to hold a can with its heads projecting slightly beyond the jaws, shearing knives on opposite sides of the jaws, means for moving said knives back and forth to shear the cans, and means for closing the jaws before the knives engage the can and for opening the jaws after the knives have severed the heads.

5. In a can deheading machine, a pair of jaws adapted to hold a can, in vertical position, with its heads projecting slightly beyond the jaws, said jaws being normally open, a support for the cans normally beneath the jaws, shearing knives above and below the jaws, means for reciprocating said knives to shear the cans, means for closing said jaws prior to the engagement of the knives with the can, and means for removing said support after the jaws have closed.

6. In a can deheading machine, a pair of jaws adapted to hold a can, in vertical position, with its heads projecting slightly beyond the jaws, said jaws being normally open, a support for the cans normally beneath the jaws, shearing knives above and below the jaws, means for reciprocating said knives to shear the cans, means for closing said jaws prior to the engagement of the knives with the can and for opening the jaws after the knives have severed the heads, and means for removing said support after the jaws have closed and for returning said support to normal position after the jaws have opened.

7. In a can deheading machine, a suitable bed, a pair of jaws mounted thereon and adapted to hold a can in vertical position with its heads projecting slightly beyond the jaws, a cross-head movable back and forth on the bed, a pair of V-shaped shearing knives movable with the cross-head and having their pointed ends adapted to engage the can body diametrically, and means for reciprocating said cross-head.

8. In a can deheading machine, a suitable bed, a pair of jaws mounted thereon and adapted to hold a can in vertical position with its heads projecting slightly beyond the jaws, a cross-head movable back and forth on the bed, a pair of V-shaped shearing knives movable with the cross-head and having their pointed ends adapted to engage the can body diametrically, a yielding connection between said cross-head and one of said jaws for moving the latter to closed position, and means for reciprocating said cross-head.

9. In a can deheading machine, a suitable bed, a pair of jaws mounted thereon and adapted to hold a can with its heads projecting, a cross-head movable on the bed, shearing knives secured to the cross-head and adapted to engage opposite ends of the jaws, and means for adjusting said knives in opposite directions.

In testimony whereof I have affixed my signature.

THOMAS D. MILLER.